United States Patent
Gilchrist et al.

(10) Patent No.: US 7,446,308 B2
(45) Date of Patent: Nov. 4, 2008

(54) METHOD OF CALIBRATING MULTI-CHANNEL NUCLEAR ENERGY SPECTRA

(75) Inventors: W. Allen Gilchrist, Houston, TX (US); Sergey Efremov, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 176 days.

(21) Appl. No.: 11/315,880

(22) Filed: Dec. 22, 2005

(65) Prior Publication Data

US 2007/0145259 A1 Jun. 28, 2007

(51) Int. Cl.
*G01V 5/08* (2006.01)
(52) U.S. Cl. .................................... 250/269.1
(58) Field of Classification Search ............... 250/269.1
See application file for complete search history.

(56) References Cited

U.S. PATENT DOCUMENTS

| | | | | |
|---|---|---|---|---|
| 4,390,783 A | * | 6/1983 | Grau | 250/269.8 |
| 4,661,701 A | * | 4/1987 | Grau | 250/269.6 |
| 4,810,876 A | * | 3/1989 | Wraight et al. | 250/256 |
| 5,489,779 A | | 2/1996 | Pemper et al. | 250/369 |
| 5,659,169 A | | 8/1997 | Mickael et al. | 250/269.3 |
| 6,005,244 A | * | 12/1999 | Vaeth et al. | 250/269.2 |
| 2002/0190198 A1 | | 12/2002 | Mickael | 250/269.3 |
| 2003/0042423 A1 | | 3/2003 | Bertelsen | 250/369 |
| 2003/0116712 A1 | | 6/2003 | Ye et al. | 250/363.04 |
| 2003/0116713 A1 | | 6/2003 | Cooke et al. | 250/369 |
| 2005/0199794 A1 | * | 9/2005 | Mickael | 250/261 |

OTHER PUBLICATIONS

W.A. Gilchrist, Jr. et al.; *Introduction of a New Through-Tubing Multifunction Pulsed Neutron Instrument*, SPE 56803, 1999 SPE Annual Technical Conference and Exhibition, Oct. 3-6, 1999, pp. 1-11, 19 Figs.
RPM Co/ Spectral Processing, Feb. 16, 2000, pp. 1-3.

* cited by examiner

*Primary Examiner*—David P. Porta
*Assistant Examiner*—Mindy Vu
(74) *Attorney, Agent, or Firm*—Madan, Mossman & Sriram, P.C.

(57) ABSTRACT

Measurements made with a nuclear logging tool are partitioned into bins to provide an energy spectrum. The energy spectrum is calibrated by maximizing a measure of similarity with a reference spectrum.

26 Claims, 4 Drawing Sheets

METHOD OF CALIBRATING MULTI-CHANNEL NUCLEAR ENERGY SPECTRA

BACKGROUND OF THE INVENTION

This invention relates generally to oil and gas well logging tools. More particularly, this invention relates to an improved method of analyzing signals produced by nuclear logging tools typically used for determination of formation density and porosity and mineralogy.

In petroleum and hydrocarbon production, it is desirable to know the porosity of the subterranean formation which contains the hydrocarbon reserves. Knowledge of porosity is essential in calculating the oil saturation and thus the volume of oil in-place within the reservoir. Knowledge of porosity is particularly useful in older oil wells where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas.

If the density of the formation is known, then porosity can be determined using known equations. A variety of tools exist which allow the density of the reservoir to be determined. Most of these tools are effective in determining the density (and hence porosity) of the reservoir when the wellbore in which the tool is run is an uncased reservoir and the tool is able to contact the subterranean medium itself. However, once a well has been cased, there exists a layer of steel and concrete between the interior of the wellbore where the tool is located and the formation itself. The well casing makes it difficult for signals to pass between the tool and the reservoir and visa versa. In addition, the cement can confuse the measurement of formation properties.

Common to the logging tools generally referred to as "nuclear" logging tools is a source of radiation. The emitted radiation interacts with the earth formation and the results of the interaction, which may be neutrons or gamma rays are detected (as pulses) by one or more detectors. Analysis of the numbers of pulses having certain amplitudes corresponding to various energy levels of gamma rays can provide information about the presence of certain elements or isotopes. A graphic representation of the number of pulses occurring with respect to the energy level of the pulses typically displays localized maxima, called "peaks" at several energy levels within the energy range of the scintillation detector, which typically is some portion of the range of 0.1 to 10 million electron volts (MeV), depending on the crystal type and the elements intended to be resolved. The peaks also have a range of energy levels characteristic to the isotope.

The amplitudes of the voltage pulses are typically analyzed by using a device called a spectral analyzer. The spectral analyzer comprises a pulse height quantizer for measuring the amplitude of each voltage pulse from the photomultiplier, and a storage device for counting the number of voltage pulses of each magnitude determined by the quantizer. Based on the amplitude measurement made by the quantizer, a quantization value called a channel number is assigned to each measured pulse. Each pulse leaving the quantizer increments a particular storage buffer in the storage device corresponding to the channel number determined for each pulse by the quantizer. At the end of any measurement period, the number of events counted in each buffer is used for analysis.

These spectra have to be calibrated so that a specific channel represents a certain energy range. This has traditionally been done by using various peak finding routines to locate spectral peaks and then using a least squares fit to determine the gain and offset needed to map these peaks into the desired energies. One difficulty with this technique is that the peak finding routines can confuse statistical variation with spectral peaks. Channel-to-channel filtering of the data is often required to prevent this problem. Unfortunately there can be a loss of resolution in the spectra when this is done.

The present invention addresses the problems inherent in the use of peak-finding techniques for channel calibration.

SUMMARY OF THE INVENTION

One embodiment of the invention is a method of evaluating an earth formation. A logging tool is conveyed into a borehole in the earth formation. Radiation indicative of a property of the formation is detected. The detected radiation is analyzed to provide a spectrum thereof. The spectrum is adjusted to increase a measure of similarity to a reference spectrum. The radiation may be gamma rays or neutrons. The radiation may be the result of irradiating the formation with a source of radiation. The irradiation may result form a pulsed neutron source or a chemical gamma ray source. The determined property may be a porosity, density and/or elemental composition of the formation. The spectrum may be obtained by providing a count of the detected radiation in each of a plurality of channels. The measure of similarity may be a correlation coefficient. Adjustment of the spectrum may be done by applying a linear transformation to the spectrum that may include a relative gain and an alignment correction. The reference spectrum may be obtained from laboratory measurements.

Another embodiment of the invention is an apparatus for evaluating an earth formation. The apparatus includes a logging tool conveyed into a borehole in the earth formation and a radiation detector which produces an output indicative of the property of the earth formation. The apparatus also includes a processor which analyzes the output of the radiation detector to provide a spectrum thereof and adjusts the spectrum to increase a measure of similarity to a reference spectrum. The radiation detector may be a gamma ray detector and/or a neutron detector. The radiation may result for irradiation of the formation using a radiation source on the logging tool. The radiation source may be a pulsed neutron source or a chemical gamma ray source. The property determined by the processor may be a porosity, a density and/or an elemental composition. The processor may determine the spectrum by providing a count of the detected radiation in each of a plurality of channels. The measure of similarity may be a correlation coefficient. The adjustment of the spectrum by the processor may include a relative gain and/or an alignment correction. The reference spectrum may be stored on a memory associated with the processor. The processor may be at a downhole location, a surface location and/or a remote location. The apparatus may include a wireline, slickline and/or drilling tubular which conveys the logging tool into the borehole Another embodiment of the invention is a machine readable medium for use with an apparatus for evaluating an earth formation. The apparatus includes a logging tool conveyed in a borehole in the earth formation and a radiation detector which produces an output indicative of a property of the earth formation. The medium includes instructions which enable a processor to analyze the output of the radiation detector to provide a spectrum, and to adjust the spectrum to increase a measure of similarity between the spectrum and a reference spectrum. The medium may be a AOM, an EPROM, an EEPROM, a flash memory and/or an optical disk.

BRIEF DESCRIPTION OF THE FIGURES

The file of this patent contains at least one drawing executed in color: Copies of this patent with color drawing(s) will be provided by the Patent and Trademark Office upon request and payment of the necessary fee. The present invention is best understood with reference to the accompanying figures in which like numerals refer to like elements and in which.

DETAILED DESCRIPTION OF THE INVENTION

Figure 1:
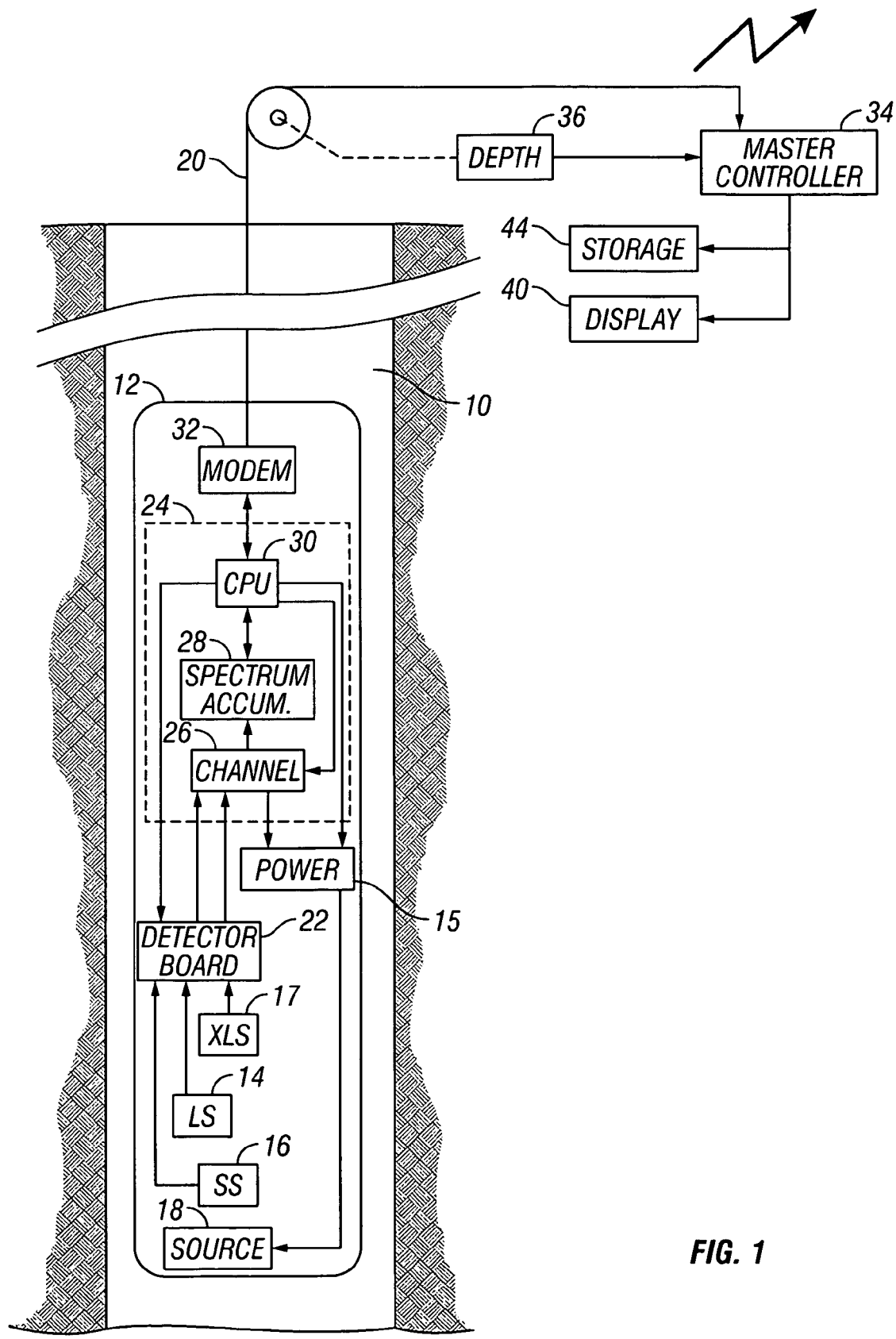
FIG. 1 is an overall schematic diagram of an exemplary nuclear well logging system used with the present invention.

The method of the present invention is applicable to a wide variety of nuclear logging instruments. The system shown in FIG. 1 is a system for logging using the method of the present invention. This is for exemplary purposes only, and the method of the present invention is usable with other logging tools that rely on measurements of nuclear radiation. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes an extra-long spaced (XLS) detector 17, a long-spaced (LS) detector 14, a short-spaced (SS) detector 16 and a radiation source 18. In one embodiment of the invention, XLS, LS and SS detectors 17, 14 and 16 are comprised of suitable material such as bismuth-germanate (BGO) crystals or sodium iodide (NaI) coupled to photomultiplier tubes. To protect the detector systems from the high temperatures encountered in boreholes, the detector system may be mounted in a Dewar-type flask. This particular source and flask arrangement is an example only, and should not be considered a limitation. It should be noted that the use of three detectors is for exemplary purposes only, and fewer or more detectors may be used. Also, in one embodiment of the invention, source 18 comprises a pulsed neutron source using a D-T reaction wherein deuterium ions are accelerated into a tritium target, thereby generating neutrons having an energy of approximately 14 MeV. This particular type of source is for exemplary purposes only and not to be construed as a limitation. In an alternate embodiment of the invention, instead of a pulsed neutron source, a gamma ray source such as $Cs^{137}$ is used. Such an arrangement is known in the art and is referred to as a chemical gamma ray source. An example is discussed in U.S. Pat. No. 5,659,169 to Michael, having the same assignee as the present invention and the contents of which are incorporated herein by reference.

When a pulsed neutron source is used, the filament current and accelerator voltage are supplied to source 18 through power supply 15. Cable 20 suspends instrument 12 in well 10 and contains the required conductors for electrically connecting instrument 12 with the surface apparatus.

The outputs from XLS, LS and SS detectors 17, 14 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 33. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, when the source 18 is a pulsed neutron source, it is pulsed at a rate of between 1000-10,000 bursts/second (1 kHz-10 kHz). This, in turn, causes a burst of high energy neutrons on the order of 14 MeV to be introduced into the surrounding formation to be investigated. As discussed below with reference to FIG. 2, this population of high energy neutrons introduced into the formation will cause the generation of gamma rays within the formation which at various times will impinge on XLS, LS and SS detectors 17, 14 and 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If such pulse has an amplitude corresponding to an energy of at least approximately 100 KeV, the voltage pulse is transformed into a digital signal and passed to channel generator 26 of MCS section 24. Details of the channel generator according to the present invention are discussed below. If, on the other hand, $Cs^{137}$ is used as a source of gamma rays, it is common practice to detect gamma rays resulting from Compton scattering.

In addition, as would be known to those versed in the art, many of the functions of the components described with reference to FIG. 1 may be carried out by a processor. It should also be noted that the system described in FIG. 1 involves conveyance of the logging device into the well by a wireline. However, it is envisaged that the logging device could be part of a measurement while drilling (MWD) bottom hole assembly conveyed into the borehole by a drilling tubular such as a drillstring or coiled tubing. In addition, it should be noted that FIG. 1 illustrates a tool in an open hole. The method and apparatus are equally well suited for use in cased holes.

Figure 2:
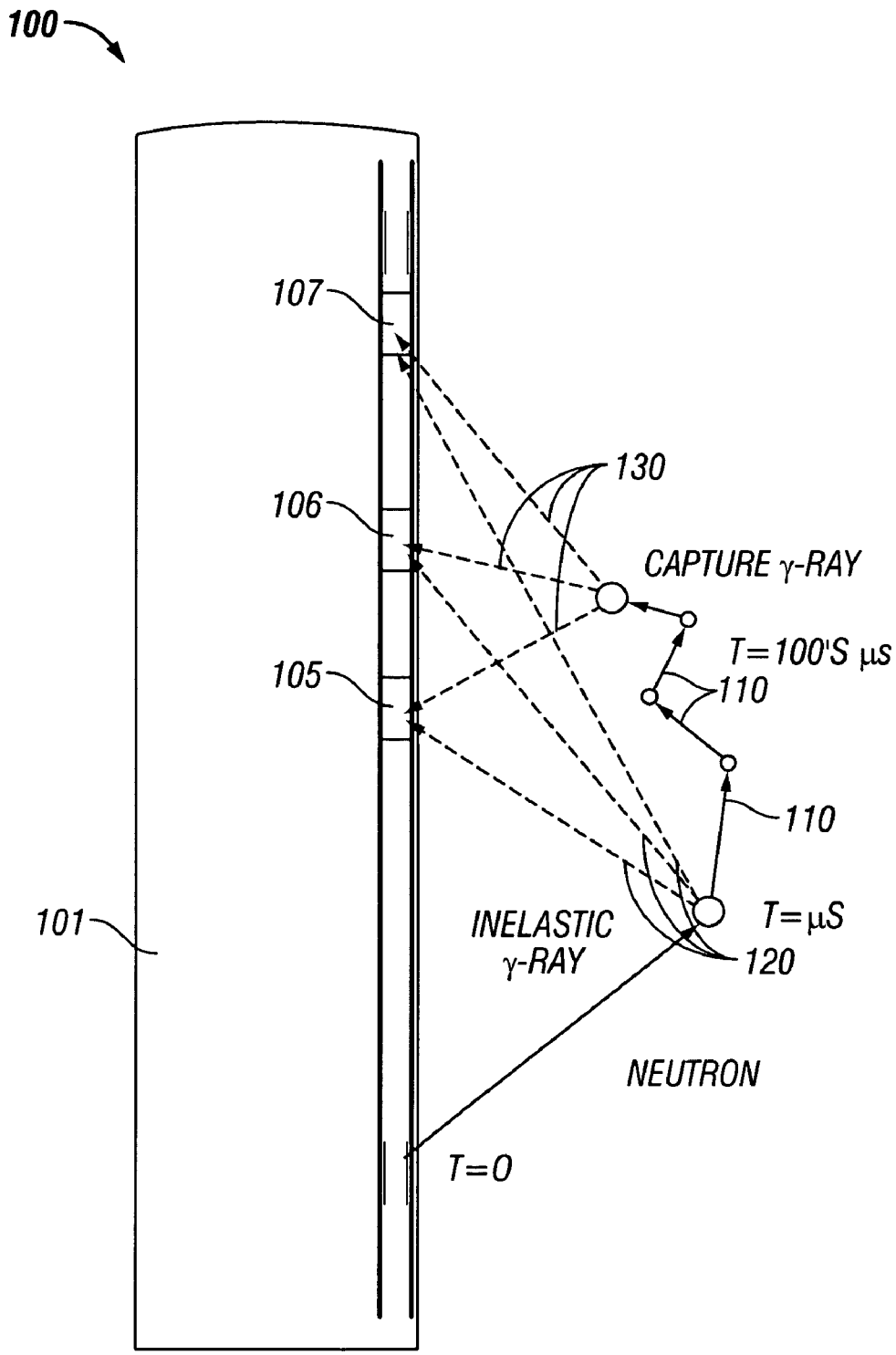
FIG. 2 (prior art) illustrates the generation of gamma rays by inelastic scattering and capture of thermal and epithermal neutrons.

FIG. 2 shows an illustration of the logging tool suitable for use with the present invention. The apparatus illustrated is that of the Reservoir Performance Monitor (RPM) of Baker Atlas Incorporated. A measurement device 100 comprises a neutron source 101 and three axially spaced apart detectors described below. The number of detectors shown in the embodiment of FIG. 2 is only an example of the number of detectors employed in an embodiment of the present invention. It is not a limitation on the scope of the present invention. The measurement device of the present invention may comprise two or more detectors. The neutron source 101 may be pulsed at different frequencies and modes for different types of measurements. The short-spaced (SS) detector 105 is closest to the source 101 The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds (μs), before they lose much energy, some neutrons are involved in inelastic scattering with nuclei in the borehole and formation and produce gamma rays. These inelastic gamma rays 120, have energies that are characteristic of the atomic nuclei that produced them. The atomic nuclei found in this environment include, for example, carbon, oxygen, silicon, calcium, and some others. As noted above, when $Cs^{137}$ is used as the radiation source, the mechanism of generation of detected gamma rays may result from Compton scattering of gamma rays from the source.

Two or more gamma-ray detectors are employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

In a pulsed neutron spectrometry mode, the instrument pulses at 10 kHz, for example, and records full inelastic and capture gamma ray energy spectra from each detector. These data are processed to determine critical elemental ratios including carbon/oxygen and calcium/silicon from the inelastic spectra and silicon/calcium from the capture spectra. A pulsed neutron holdup imager mode yields both energy spectra and time decay spectra from each detector simultaneously. Measurements can be used to determine holdups of gas, oil, and water. When combined with other production logs, the measurements made herein can provide a comprehensive production profile picture, even in deviated or horizontal wells. A neutron activation mode provides water-flow measurements using one of several data acquisition methods. Stationary measurements are made in either of two modes, and measurements at different logging speeds can be used to segregate different flow rates in either an annulus or in an adjacent tubing string. Various spectra of count rates from these can be used either individually or in combination as needed for each measurement mode.

Still referring to the pulsed neutron spectrometry mode, with the neutron generator turned off, the measurement apparatus can also be used to detect the distribution of materials, tagged with radioactive tracers, that are injected into the well during well treatments. In this manner, the effectiveness of operations such as hydraulic fracturing or gravel pack placement can be evaluated.

In one application of the present invention, a pulsed neutron generator with improved reliability and higher output is coupled with high-speed downhole microprocessor-controlled drivers and detector electronics. The system supports multiple frequency operation and different detection gate timings to make the different measurements. The modes of operation can be selected from the surface with no need to pull the tool out of the well.

After just a few μs, most of the neutrons are slowed by either inelastic or elastic scattering until they reach thermal energies, about 0.025 eV. This process is illustrated schematically in FIG. 2 as the sequence of solid arrows 110. At thermal energies, neutrons continue to undergo elastic collisions, but they no longer lose energy on average. A few μs after the neutron generator shuts off, this process is complete. Over the next several hundred μs, thermal neutrons are captured by nuclei of various elements —again producing gammas rays, known as capture gamma rays 130. A capture gamma ray energy spectrum yields information about the relative abundances of these elements.

Figure 3:
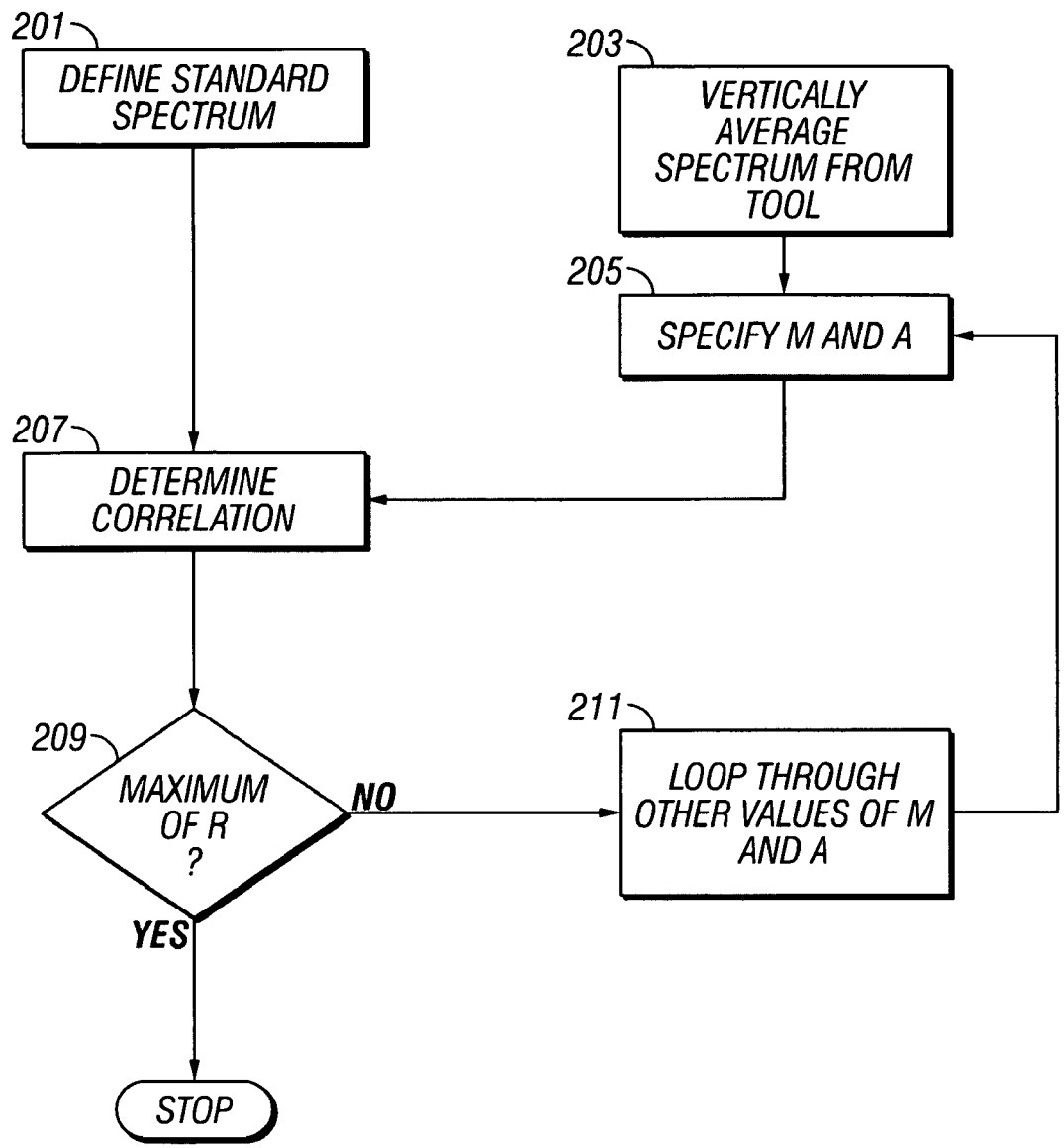
FIG. 3 is a flow chart illustrating some of the steps of the method of the present invention.

Turning now to FIG. 3, a flow chart illustrating the method of the present invention is shown. It should be noted that the method may be used regardless of the type of radiation source. The process starts with the definition of a standard spectrum 201. The standard spectrum is composed of a combination of properly calibrated standard spectra and may be obtained from published values of peak energy and peak width (defined by a range of six standard deviations around the peak). Table I (after U.S. Pat. No. 5,489,779 to Pemper) gives spectral peaks and widths for isotopes commonly found in earth formations for natural gamma ray logging.

TABLE 1

| RADIO-ISOTOPE | PEAK ENERGY (MeV) | PEAK WIDTH (MeV) |
|---|---|---|
| $U^{238}$ | 0.245 | 0.063 |
| $U^{238}$ | 0.295 | 0.072 |
| $U^{238}$ | 0.352 | 0.082 |
| $U^{238}$ | 0.609 | 0.126 |
| $U^{238}$ | 1.120 | 0.203 |
| $K^{40}$ | 1.461 | 0.247 |
| $U^{238}$ | 1.765 | 0.281 |

Other standards would be used depending upon the particular application. For example, for elemental analysis of earth formation, the spectral peaks corresponding to inelastic scattering from Carbon, Calcium, Chlorine, Iron, Magnesium, Oxygen and Silicon may be used for defining the standard spectrum. For clay analysis, it is important to include Aluminum. These characteristic peaks may be obtained from published tables or by making measurements using the logging tool in controlled laboratory conditions. See also SPE56803 of Gilchrist et al. As discussed therein, a calibration is necessary to map the channel numbers into corresponding energies expressed in MeV. The positions of several peaks, expressed in channel numbers within the capture spectrum, are determined using a sophisticated peak detection routine. The positions of these peaks along with their known energies are then used to determine a calibration that will translate channel numbers into the proper energies. This calibration is then applied to the spectra.

The present invention does not require a peak detection routine. A vertically averaged spectrum from the logging tool is obtained 203. Ideally, the spectrum defined by the count within each of the channels for the standard and the averaged measurements should be the same. In prior art methods, peaks in the standard spectrum are compared with peaks in the measured spectrum and adjustments are made to the energy bands associated with particular channels on the field data to align them with peaks in the standard spectrum. Due to the fact that the field measurements are statistical in nature, the possibility of errors in the positions and magnitude of spectral peaks arises.

In the present invention, a relative gain M and alignment correction A between the standard spectrum and the vertically averaged spectrum are defined 205. A cross correlation between the standard spectrum and the averaged measurement with the relative gain and shift applied is determined 207. The correlation coefficient r is defined as:

$$r = \frac{N \sum x_i y_i - \sum x_i \sum y_i}{[N \sum x_i^2 - (\sum x_i)^2]^{1/2} [N \sum y_i^2 - (\sum y_i)^2]^{1/2}} \quad (1)$$

where
r is the correlation coefficient,
N is the number of channels (maximum of 256),
$x_i$ is the number of counts in the i-th channel of the standard spectrum, and
$y_i$ is the number of counts in the i-th channel of the resampled measured spectrum.

The quantity defined by eqn. (1) is referred to as the Pearson product-moment correlation coefficient. Pearson's correlation coefficient is a parametric statistic, and it may be less useful if the underlying assumption of normality is violated. Non-parametric correlation methods, such as Spearman's ρ and Kendall's τ may be useful when distributions are not normal; they are a little less powerful than parametric methods if the assumptions underlying the latter are met, but are less likely to give distorted results when the assumptions fail.

These correlations are repeated for a range of values of M and A 211 and a search for a maximum of the correlation is made 209. Once the maximum has been found, this is then used to calibrate the measured spectrum. The use of the relative gain and an alignment correction is an example of a linear transformation of the spectrum. Other linear transformations may also be used.

Figure 4:
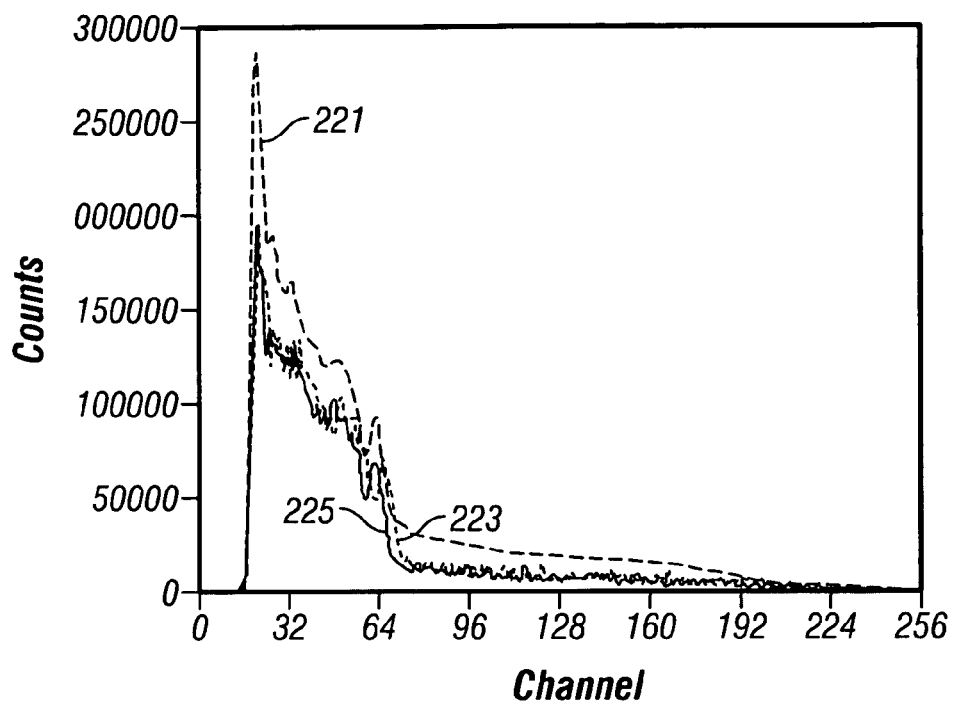
FIG. 4 is a plot showing the results of using the method of the present invention.

The results of using the method on an exemplary set of data are shown in FIG. 4. The abscissa is the channel number and the ordinate is the counts within each channel. The curve 221 is the standard curve and the curve 225 is the measured (uncalibrated) spectrum. The curve 225 shows the calibrated spectrum using the gain M and alignment correction A that gives the best correlation from eqn. (1). It should be noted that the particular example of using the normalized cross-correlation is not to be construed as a limitation of the invention, and other measures of similarly between curves could be maximized.

Figure 5:
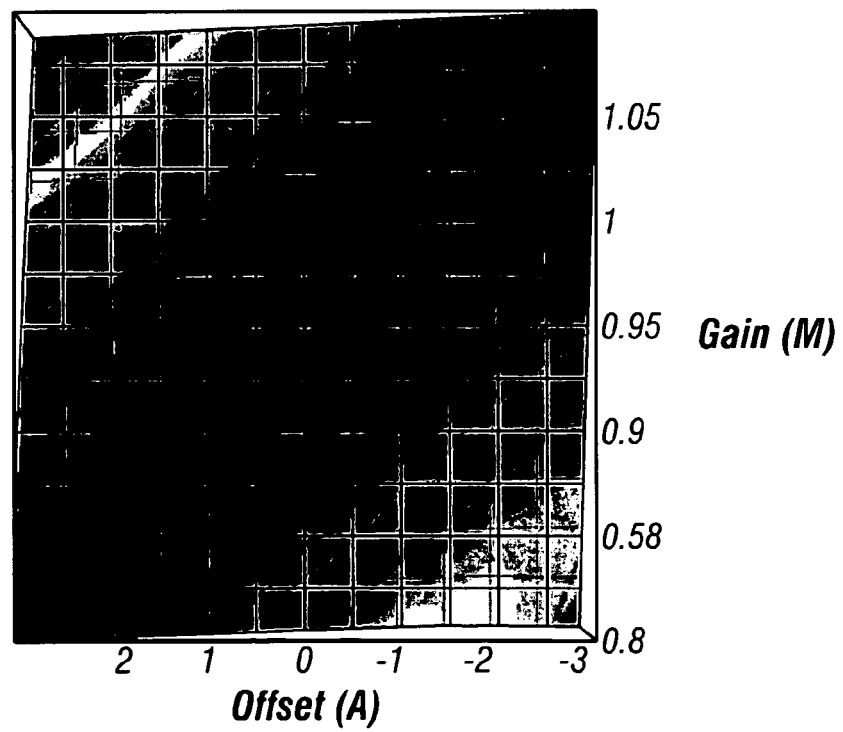
FIG. 5 is an exemplary plot showing correlation coefficient as a function of gain and shift.

Turning now to FIG. 5, a plot is shown of the correlation coefficient given by eqn. (1) as a function of offset (abscissa) and the gain (ordinate). The optimum gain and offset in this case were M=0.9488 and A=0.02625, resulting in a correlation coefficient, r=0.99323.

After the data have been calibrated, they may be further analyzed to determine a property of the earth formation using prior art methods. Depending upon the particular measurements being made, the property could be density, porosity and/or an elemental composition of the earth formation. The measurements are of radiation such as gamma rays, neutrons and/or photons. The radiation could be natural radiation or radiation resulting from irradiation of the earth formation using a nuclear source such as a neutron source and/or a gamma ray source. While a wireline implemented example has been discussed above, the measurements could be made using a logging tool conveyed on a slickline, or a logging tool that is part of a bottomhole assembly conveyed on a drilling tubular.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the specific embodiments of the invention, various modifications will be apparent to those skilled in the art. It is intended that all such variations within the scope and spirit of the appended claims be embraced by the foregoing disclosure.

The following definitions of terms is useful in understanding the invention:
alignment: the proper positioning or state of adjustment of parts in relation to each other;
calibrate: to standardize by determining the deviation from a standard so as to ascertain the proper correction factors;
chemical gamma ray source: a source which produces gamma rays as a result of spontaneous decay of a radioactive nuclei;
correlation coefficient: a number or function that indicates the degree of correlation between two sets of data or between two random variables;
drilling tubular: made or provided with tubes and used for conveying a drill.
EAROM: electrically alterable ROM;
EPROM: erasable programmable ROM;
flash memory: a nonvolatile memory that is rewritable;
gain: an increase or decrease in magnitude;
gamma ray: a photon emitted spontaneously by a radioactive substance;
irradiate: to affect or treat by radiant energy;
linear transformation: Linear transformations are functions that send, or "map," one vector to another vector;
log: a record of performance, events, or day-to-day activities;
machine readable medium: something on which information may be stored in a form that can be understood by a computer or a processor;

measure of similarity: a quantitative measure of resemblance;

neutron: an uncharged elementary particle that has a mass nearly equal to that of the proton and is present in all known atomic nuclei except the hydrogen nucleus;

Optical disk: a disc shaped medium in which optical methods are used for storing and retrieving information;

Pulsed neutron source: a controllable device capable of producing a pulsed output of neutrons;

radiation: flow of atomic and subatomic particles and of waves;

ROM: Read-only memory;

slickline: a wireline that does not include electrical conductors;

spectrum: energy or power distribution as a function of energy of radiation;

well log: A record of one or more physical measurements as a function of depth in a borehole. Also called a borehole log. Distinction is sometimes made between a log as an entire record (which may contain curves showing several measurements) and the individual curves themselves, which are also called logs; and wireline: The wire rope used to lower and raise tools in a borehole.

What is claimed is:

1. A method of evaluating an earth formation comprising:
   (a) conveying a logging tool into a borehole in the earth formation;
   (b) detecting radiation indicative of a property of the earth formation;
   (c) analyzing the detected radiation to provide a spectrum thereof; and
   (d) correlating the spectrum and a standard spectrum for determining single alignment correction between a plurality of values of the spectrum and a plurality of values of the standard-spectrum.

2. The method of claim 1 wherein detecting the radiation further comprises detecting at least one of (i) gamma rays, and (ii) neutrons.

3. The method of claim 1 further comprising irradiating the earth formation with a source of radiation, the detected radiation resulting from interaction of the irradiation with the earth formation.

4. The method of claim 3 further comprising performing the irradiating by using a source selected from (i) a pulsed neutron source, and (ii) a chemical gamma ray source.

5. The method of claim 1 wherein the property is selected from the group consisting of (i) a porosity, (ii) a density, and (iii) an elemental composition.

6. The method of claim 1 wherein determining the alignment correction further comprises providing a count of the detected radiation in each of a plurality of channels.

7. The method of claim 1 wherein determining the alignment correction further comprises applying a linear transformation to the spectrum.

8. The method of claim 1 further comprising adjusting a relative gain

9. The method of claim 1 further comprising defining the standard spectrum based on laboratory measurements.

10. The method of claim 1 wherein using the correlation method further comprises using at least one of (i) a parametric method, and (ii) a non-parametric method.

11. An apparatus for evaluating an earth formation comprising:
   (a) a detector in a borehole in the earth formation configured to produce an output indicative of a property of the earth formation; and
   (b) a processor configured to:
      (A) use the output of the detector to provide a spectrum; and
      (B) correlate the spectrum and a reference spectrum to determine a single alignment correction between a plurality of values of the spectrum and a plurality of values of the reference spectrum.

12. The apparatus of claim 11 wherein the radiation detector is selected from the group consisting of: (i) a gamma ray detector, and (ii) a neutron detector.

13. The apparatus of claim 11 comprising a source of radiation on the logging tool configured to irradiate the earth formation, the detected radiation resulting from interaction of the irradiation with the earth formation.

14. The apparatus of claim 13 wherein the source of radiation is selected from (i) a pulsed neutron source, and (ii) a chemical gamma ray source.

15. The apparatus of claim 11 wherein the processor is further configured to determine the property and wherein the property is selected from the group consisting of (i) a porosity, (ii) a density, and (iii) an elemental composition.

16. The apparatus of claim 11 wherein the processor is configured to provide the spectrum by further providing a count of the detected radiation in each of a plurality of channels.

17. The apparatus of claim 11 wherein the processor is further configured to adjust a relative gain.

18. The apparatus of claim 11 wherein the reference spectrum is stored on a memory associated with the processor.

19. The apparatus of claim 11 wherein the processor is configured to be at one of (i) a downhole location, (ii) a surface location, and (iii) a remote location.

20. The apparatus of claim 11 further comprising a conveyance device selected from (i) a wireline, (ii) a slickline, and (iii) a drilling tubular, the conveyance device configured to convey a logging tool including the detector into the borehole.

21. The apparatus of claim 11 wherein the detector is conveyed on a logging tool.

22. The apparatus of claim 11 wherein the detector further comprises a radiation detector.

23. A machine readable medium for use with an apparatus for evaluating an earth formation, the apparatus comprising:
   (a) a detector conveyed in a borehole in the earth formation configured to produce an output indicative of a property of the earth formation;
   the medium comprising instructions which enable a processor to:
   (b) use the output of the detector to provide a spectrum; and
   (c) correlate the spectrum and a standard spectrum to determine a single alignment correction between a plurality of values of the spectrum and a plurality of values of the standard spectrum.

24. The machine readable medium of claim 23 further comprising at least one of (i) a ROM, (ii) an EPROM, (iii) an EEPROM, (iv) a flash memory, and (v) an optical disk.

25. The medium of claim 23 wherein the instructions further enable the processor to apply a linear transformation to the spectrum.

26. The medium of claim 23 wherein the instructions further enable the processor to use a relative gain.

* * * * *